W. E. WILLIAMS.
PLATE DISK WHEEL.
APPLICATION FILED DEC. 5, 1919.
1,378,301.
Patented May 17, 1921.
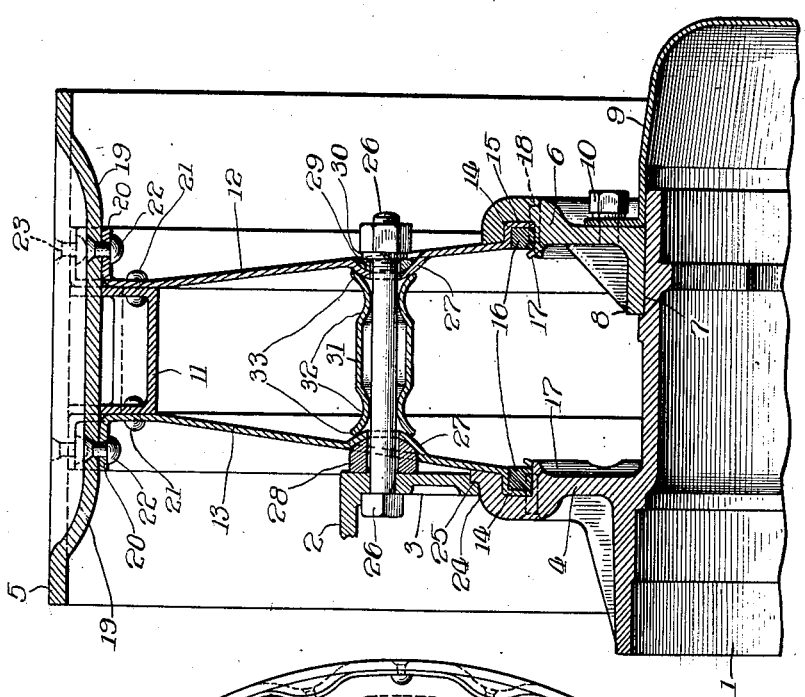
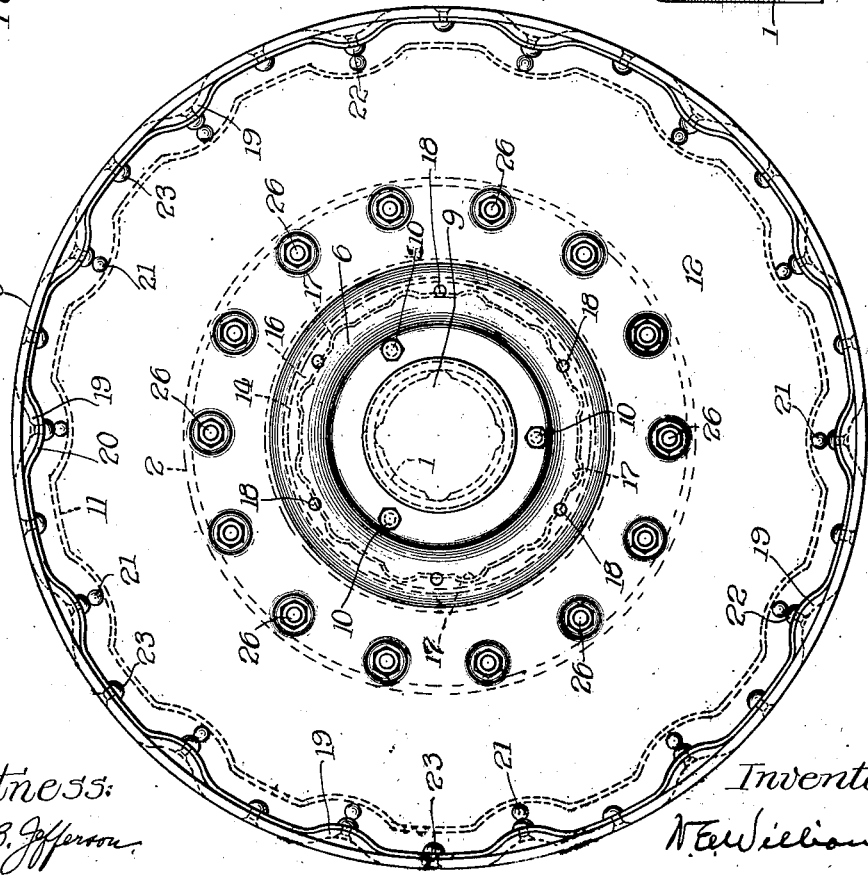
Witness:
J.B. Jefferson
Inventor:
W. E. Williams

UNITED STATES PATENT OFFICE.

WILLIAM ERASTUS WILLIAMS, OF CHICAGO, ILLINOIS.

PLATE DISK WHEEL.

1,378,301.  Specification of Letters Patent.  Patented May 17, 1921.

Application filed December 5, 1919. Serial No. 342,578.

*To all whom it may concern:*

Be it known that I, WILLIAM ERASTUS WILLIAMS, a citizen of the United States, a resident of Chicago, in the county of Cook and State of Illinois, have invented a new and useful Improvement in Plate Disk Wheels, of which the following is a specification.

The object of my invention is to make a light, cheap, strong and durable disk wheel for automobile trucks and other purposes.

Reference will be had to the accompanying drawings, in which Figure 1 is a front elevation of the wheel.

Fig. 2 is a section in the plane of the axes of the hub and one of the spokes on a larger scale than that of Fig. 1, showing only one-half of the wheel.

In the drawing 1 indicates the ordinary wheel hub of an automobile truck. 2 indicates the brake drum which is cut away and only the brake drum flange 3 is shown. 4 is a flange at the rear of the hub, a location selected when wooden spokes are used with such hubs.

5 is a rim of the wheel and is here shown as of the type with which "pressed on" rubber tires are used.

6 indicates a flange not integral with the hub, but is pressed on so tightly that it is practically integral when the parts are assembled; but the wheel is more easily made when these parts are primarily distinct.

9 indicates an ordinary protecting hub cap, which is secured to the flange 6 by the screws 10. A channel ring 11 extends around the central zone of the rim 5.

Disks 12 and 13, which are substantially alike, but reversely faced, form the web portion of the wheel and they are secured around the hub zone by annular groove offsets 14, which are pressed tightly into the annular grooves 15 of the flanges 6 and 4.

Rings 16 fill the grooves in the offsets 14 and are pressed in with such force that the disks 12, 13, are held as if integral with 4 and 6, respectively. For convenience, the assembling of the flanges, disks, and ring precedes pressing the flange 6 into place on the hub, and at the completion of such assembling thin flanges 17 are bent over the rings to retain them, and rivets 18 add security.

The rim 5 is depressed at intervals around its circumference to form depressions 19 for a two fold purpose. One purpose is to stiffen the outer margins of the rim and increase the bending moment required to make an indentation on a small area on the outer edge of the rim 5. The second purpose is to permit the rim to spring slightly, as owing to the depressions it will do without permanent set, under the heavy pressure used in forcing over them the steel bases of tires.

The plates 12, 13, have circumferential flanges 20 formed to fit the inner surface of the rim and are secured by rivets 21 to the channel ring 11, and to both rim and ring by rivets 22, the rivets being preferred to spot welding.

The brake drum 2, through the medium of its flange 3 rests at 24 on a shoulder of the annular flange 4 of the hub. An offset 25 serves to aid in preventing lateral displacement of the brake drum flange 3 upon the flange 4 of the hub.

The brake drum is secured to the disks 12 and 13 by a series of bolts 26. These bolts pass through holes in the disks and where these holes occur the disks themselves are depressed into hemispherical or concave inward depressions or bosses as indicated by 27 for the purpose of giving a larger area or section of metal in the plates to resist the tearing strains of the bolts.

In these depressions 27 there are provided washers 28 and 29 which are shaped on the inside to fit the depressions 27 and are flat outside where they abut against the flange 3 and the nut lock washer 30, under the nut of the bolts 26.

Mutual approach of the plates under the strain of the bolts 26 is prevented by sleeve-like struts 31, constricted at 32 to keep them rigid and concentric with the bolts, and terminally expanded to meet the bosses 27 on a larger circle of contact, avoiding concentration of pressure, and insuring alinement independently of the bolts.

The wheel disks can safely be made very thin because of the peculiar attachment at the hub and at the brake drum.

The inclined or bracing positions of the disks themselves permit the wheel to sustain tremendous skidding strains without danger.

In assembling the wheel parts, as I before stated, the disks 12 and 13 are secured to their respective hub flanges and then the disks are assembled into the wheel 4.

In assembling the wheel, the annular channel ring 11 is first placed in position on the disk 13 after the latter has been secured to this main flange and then the disk 12, with its attached flange 16 is pressed on to the hub until the outer margin of the disk rests home on the side of the channel ring 11.

The riveting or spot welding as indicated by 21 is then performed, as there is then free access from the outside to the inside of the channel ring 11. The hollow struts or thimbles 31 are placed in position before the plate 12 is pressed home in contact with the channel ring 11. Owing to the embrace of the projection 27 by the ends 33 of the struts, these struts are held in place before bolts secure them against displacement.

After this riveting or welding is performed the outside rim 5 is pressed on and then riveted, or welded as desired, to the flanges 20 by the rivets 22 and 23, thus completing the wheel assembly.

What I claim is:—

1. In a wheel of the class described, the combination with a flange fixed to the hub and a pressed on flange on the hub, these flanges being provided with annular grooves that face each other when the flanges are assembled on the hub, of two disks secured to these flanges by being engaged in the annular grooves thereof and of locking rings pressed into the grooves.

2. The combination with a hub having spaced circumferential flanges with facing annular grooves near their margins, of two outwardly converging wheel disks embossed to form lateral annular ribs fitting said grooves, respectively, two rings pressed into said ribs, respectively, to lock them in the grooves, and means for preventing any movement of the rings.

3. In a disk wheel, two disks secured to the hub by suitable means and connected to a channel ring in the region of the rim and the said disks provided with outwardly turned annular flanges and with a rim pressed on to the flanges and the channel ring and secured thereto.

4. In a disk wheel, the combination with a hub and rim, of a rim-reinforcing member fitting the interior peripheral surface of the rim and forming the lateral and interior boundaries of an annular space adjacent to the medial portion of the rim, and two disks extending from the hub and secured to the rim and to opposite sides, respectively, of the rim-reinforcing member.

5. The combination with a hub carrying two spaced outwardly converging wheel disks having in their central or intermediate zones, respectively, a series of inwardly pressed, centrally perforated bosses, of inwardly convex washers fitting in said bosses, respectively, bolts passing through each pair of corresponding washers and the disks, and tubular struts encircling the bolts, respectively, and terminally fitting over the corresponding bosses.

6. In a wheel of the class described, a rim having a series of indentures or depressions transversely on the rim for giving transverse stiffness to the rim, together with a slight degree of elasticity.

7. In a wheel of the class described, a rim having a series of indentures or depressions transversely on the rim for giving transverse stiffness to the rim, together with a slight degree of elasticity, with a reinforcing ring on the inside of the rim and fitted to the contour of the rim.

8. In a wheel of the class described, a rim having a series of indentures or depressions transversely on the rim for giving transverse stiffness to the rim, together with a slight degree of elasticity, with a reinforcing ring on the inside of the rim and fitted to the contour of the rim, with plate disks forming the web of the wheel properly secured to the hub and secured both to the channel ring and to the rim.

9. In a wheel of the class described, plates forming the web of the wheel with lateral flanges at their margins, a channel ring located between the plates and secured on each side to the adjacent plate, with the rim pressed on to the flanges of the disks and the intervening channel ring.

Signed at Chicago, in the county of Cook and State of Illinois, this twentieth day of November, 1919.

WILLIAM ERASTUS WILLIAMS.

Witnesses:
J. B. JEFFERSON,
B. J. BERNHARD.